United States Patent [19]

Martin et al.

[11] Patent Number: 4,571,135
[45] Date of Patent: Feb. 18, 1986

[54] ENCAGED NUT

[75] Inventors: Joël Martin, Saint Cosme en Vairais; Maxime Boire, Chaville, both of France

[73] Assignees: Simmonds S.A.; Societe Nationale Industriele et Aerospatiale, both of France

[21] Appl. No.: 613,199

[22] Filed: May 23, 1984

[30] Foreign Application Priority Data

May 31, 1983 [FR] France ................... 83 09034

[51] Int. Cl.$^4$ .................. F16B 27/00; F16B 41/00
[52] U.S. Cl. .......................... 411/85; 411/82; 411/427; 411/966
[58] Field of Search ............ 411/82, 84, 85, 87, 411/88, 98, 99, 101, 106, 107, 111, 113, 132, 134, 135, 427, 432, 443, 444, 902, 903, 965, 966

[56] References Cited

U.S. PATENT DOCUMENTS

| | | | |
|---|---|---|---|
| 2,144,553 | 1/1939 | Simmonds | 411/85 X |
| 2,344,102 | 3/1944 | Meisterhans | 411/82 |
| 2,469,312 | 5/1949 | Poupitch . | |
| 2,969,831 | 1/1961 | Eames | 411/902 X |
| 3,446,261 | 5/1969 | Dey | 411/85 |
| 3,646,982 | 5/1972 | Cushman . | |

FOREIGN PATENT DOCUMENTS

| | | | |
|---|---|---|---|
| 854528 | 12/1941 | France . | |
| 257198 | 4/1949 | France | 411/427 |
| 265915 | 3/1950 | Switzerland . | |
| 608911 | 1/1948 | United Kingdom . | |
| 2098695 | 11/1982 | United Kingdom | 411/427 |

Primary Examiner—Thomas J. Holko
Attorney, Agent, or Firm—Steinberg & Raskin

[57] ABSTRACT

The present invention relates to encaged nuts manufactured either singly or in the form of a strip or band of such nuts.

Said encaged nuts include essentially a nut (1) floatingly retained by a circlip (10) between the legs (9) of a support (2) of U-shaped cross-section whose base (3) is sandwiched between a lower strip (5) and an upper strip (4) which may be adhesively attached to any part or member of composite material.

The encaged nuts according to the invention, whether used singly or in the form of a strip, allow assembling elements of a composite material such as for example panels.

2 Claims, 5 Drawing Figures

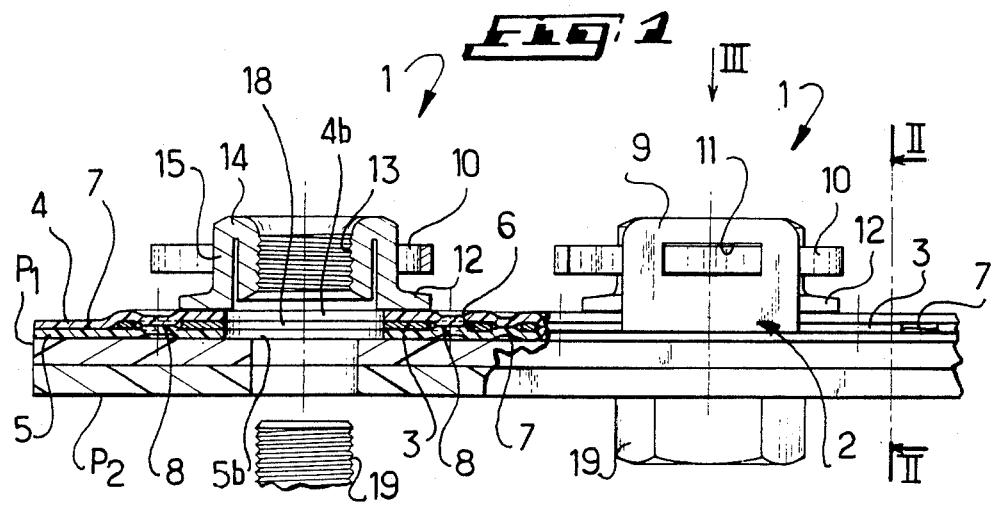
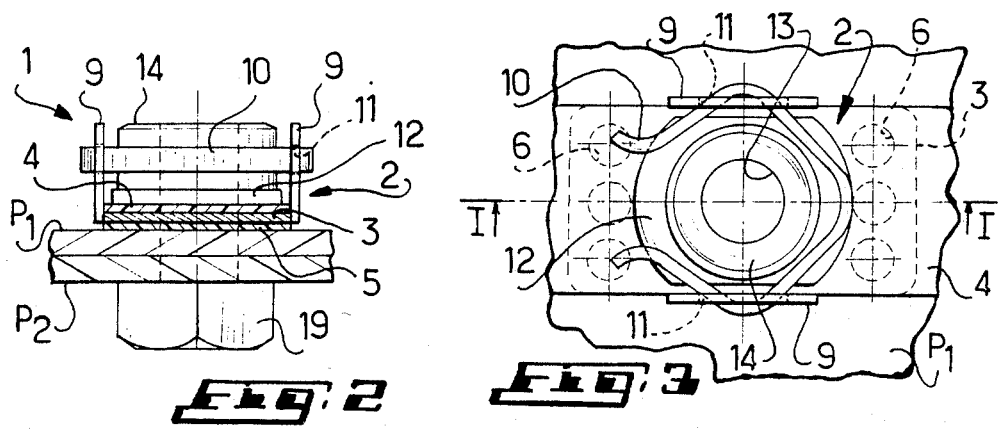
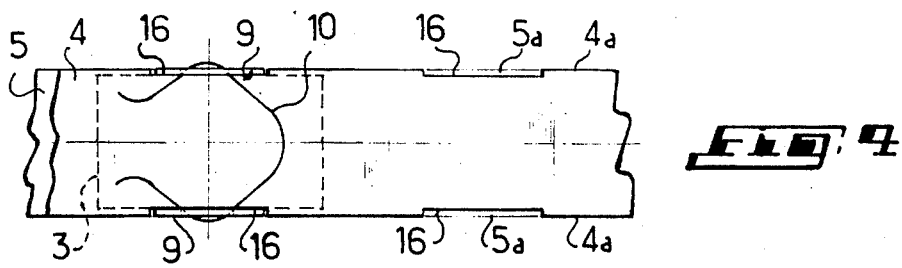
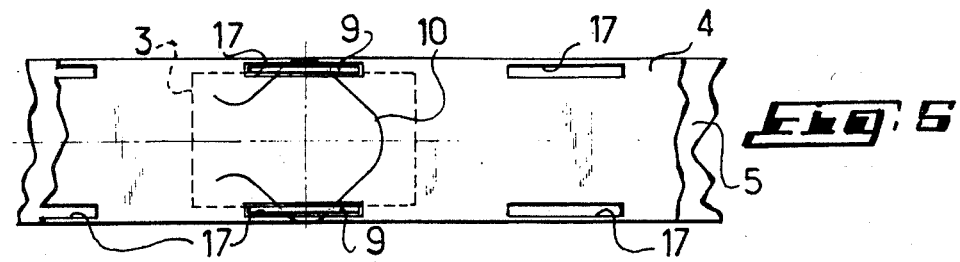

ENCAGED NUT

BACKGROUND OF THE INVENTION

The present invention has essentially for a subject matter a method for making an encaged nut for assembling metal or composite materials in the form of for example plates or panels constituted by fibres coated with a synthetic resin or the like.

It is also directed to a product obtained by the said method, i.e., more precisely, separate encaged nuts or a plurality of such encaged nuts connected together into a flexible strip.

Encaged nuts have generally been known for a long time, which include essentially a nut placed in a substantially U-shaped support the base of which can be secured to an element such as for example a panel, so as to thereafter secure the said element to another element by screwing and thus obtain an assembly.

More precisely, there have already been proposed encaged nuts connected into a strip including a metal member of U-shaped cross-section between the legs of which are mounted a plurality of floating nuts. The strip may be secured by riveting e.g. to a panel which can thereafter be assembled by screwing e.g. to another panel.

However, such a metal and rigid strip of encaged nuts is not suitable for assembling composite materials which, nowadays and as is well known, tend to replace the traditional materials used to obtain any particular part or member, especially in the aircraft industry.

Indeed, it is known that the assembling of composite materials remains a difficult operation and, in any case, the riveting of such materials is to be prohibited. Furthermore, the nuts used to assemble such materials must be such as to avoid any galvanic corrosion, i.e., the appearance of a potential between the fibres of the composite material and the metal of the nut. Now this phenomenon necessarily occurs with the known encaged nuts or with the encaged nuts connected together into a metal strip, as explained previously.

SUMMARY OF THE INVENTION

The present invention therefore has as its purpose to remedy the above drawbacks by providing an encaged nut or a strip of such engaged nuts which is flexible, light and can be secured without riveting, prevents any galvanic corrosion and therefore allows the composite materials to be assembled securely and reliably without any risk of damaging or prejudicing the intrinsic qualities of the material after the assembling.

To this end, the invention has for a subject matter a method for making an encaged nut, of the type consisting in placing a nut in a substantially U-shaped support whose base can be secured to an element such as for example a panel, which is thereafter secured by screwing to another element to thus obtain an assembly, characterized in that before placing the nut in its U-shaped support, a strip or band of synthetic material, such as for example a composite material, is arranged on each face of the base of the U-shaped support, whereafter the two strips are compressed and possibly heated so as to adhere to one another along at least a portion of the external periphery of the said base which is thus sandwiched between the two strips, so that after placing the nut in its support, the latter can be attached to an element of composite material as a result of mere adherence of the said strips to the said element.

According to another feature of this method, a plurality of nut supports more or less spaced from one another are sandwiched by their respective bases between the said two strips.

There is thus obtained a succession of nuts connected together into a flexible and light strip or band which can be attached, e.g. adhesively, to the element to be assembled.

According to still another feature of this method, the said two strips are caused to adhere to one another not only along at least a portion of the external periphery of the base of each U-shaped support, but also in the region of openings provided in the said base.

In other words, the nut support or supports are thus firmly and reliably held confined between the two strips of composite material.

The invention is also directed to an encaged nut obtained by the above method and of the type including a nut retained in a substantially U-shaped support, characterized in that the base of the said U-shaped support is confined between a lower and an upper strip or band of synthetic material such as for example a composite material, which strips may be attached, as a result of mere adherence, to an element which also is of a composite material.

According to still another feature of the invention, the said two strips grip a plurality of other encaged nuts by the base of their respective supports so as to constitute a flexible strip provided with several interconnected encaged nuts.

According to still another feature of the invention, when mounted between the legs of the U-shaped support, e.g. by means of a circlip, the nut proper rests by its lower or bearing face upon the upper strip passing between said legs.

According to one form of embodiment, the said upper and lower strips are provided with respective parallel longitudinal edges.

According to another form of embodiment, the lower strip is provided with parallel longitudinal edges, whereas the upper strip is provided with longitudinal edges with notches or apertures providing a passage for the legs of the U-shaped support.

Thus, the compression and heating of the two strips result in attaching them to one another along practically the whole periphery of the base of the support.

It will also be added here that the said two strips are provided with one or several holes, respectively, coinciding with the hole of the base of the U-shaped support or supports of the nut.

According to a preferred form of embodiment, the nut proper is a resiliently deformable nut including an internally tapped barrel portion connected by its upper portion to a concentric external skirt portion.

The invention is also directed to an assembly of panels or the like of a composite material obtained by means of separate encaged nuts or of nuts connected together into a strip, complying with any one of the afore-mentioned features.

BRIEF DESCRIPTION OF THE DRAWINGS

But other advantages and features of the invention will appear more clearly from the following detailed description made with reference to the appended drawings given solely by way of example and wherein:

FIG. 1 is an elevational view of a portion of a strip of encaged nuts according to the invention, one of the said nuts being shown in axial section;

FIG. 2 is a sectional end view of the said strip upon the line II—II of FIG. 1;

FIG. 3 is a top view of an encaged nut, in the direction of arrow III of FIG. 1;

FIG. 4 is a top view showing more particularly the two strips gripping the base of the nut support, according to a first form of embodiment; and FIG. 5 is a top view illustrating a second form of embodiment of the two aforesaid strips.

DETAILED DESCRIPTION OF THE PREFERRED EMBODIMENTS

According to an example of embodiment, and referring to FIGS. 1 to 3, an encaged nut according to the invention includes essentially a nut 1 placed in a support 2 of substantially U-shaped cross-section whose base 3 is sandwiched between an upper strip or band 4 and a lower strip or band 5, both said strips or bands being preferably of a composite material, i.e., constituted for example by carbon fibres coated with a synthetic resin.

The nut 1 and its support 2 with the strips 4 and 5 can be manufactured separately or singly, or they can be made in such a manner as to constitute a flexible strip provided with a plurality of encaged nuts, as seen clearly in FIG. 1 showing two such nuts.

In this case, the upper strip 4 and the lower strip 5 grip the base 3 of the successive supports, each containing a nut 1.

The base 3 of each support 2 is preferably provided with holes 6 which are clearly visible in FIG. 3. Thus, after compressing and/or heating the strips 4 and 5, the latter will adhere to one another not only in the region of the external periphery of the base 3, as shown at 7 in FIG. 1, but also in the region of the holes 6 as seen at 8 in the same Figure. It is therefore understood that the support or supports 2 are thus firmly retained between the strips 4 and 5.

The nut proper 1 may be of any type and is mounted between the legs 9 of the U-shaped support 2 by means of a circlip or the like 10. As seen in the right portion of FIG. 1, and also in FIGS. 2 to 5, the circlip 10 forms an open loop which passes through apertures 11 provided in the legs 9 of each support 2. It is therefore understood that the nut 1 is retained floatingly in its support 2, since the bearing face 12 of the nut can play in the vertical direction between the circlip 10 retaining it and the upper strip 4 which, together with the strip 5, sandwiches the base 3 of the U-shaped support 2.

According to a preferred form of embodiment, the nut 1 is a nut of the resiliently deformable type and includes, as seen in the left portion of FIG. 1, an internally tapped barrel portion 3 connected by its upper portion 14 to an external skirt portion 15 concentric with the barrel portion 13 and whose lower portion constitutes the bearing face 12 of the nut 1.

The strips 4 and 5 of composite material may have the same width and be provided with respective parallel longitudinal edges. Otherwise stated, as seen in FIG. 2, the lower strip 5 has a width substantially identical with that of the upper strip 4 passing between the legs 9 of the support 2.

According to another form of embodiment illustrated in FIG. 4, the lower strip 5 is provided with parallel longitudinal edges 5a, whereas the upper strip 4 is provided with longitudinal edges 4a with notches, cuts or the like 16 into which pass the legs 9 of the support 2.

According to the form of embodiment illustrated in FIG. 5, the upper strip 4 is provided with holes or apertures 17 providing a passage for the legs 9 which are introduced through the said apertures. This form of embodiment, as well as, besides, that of FIG. 4, offers the advantage of allowing the strips 4 and 5 to extend naturally beyond the base of each support 2. Thus, the strips 4 and 5 can be attached together not only in the region of the holes 6 and of the ends of the base 2, but also at the sides of the said base which will thus be completely confined or enclosed between the two strips 4 and 5 of composite material.

Of course, the strips 4 and 5 are provided with holes shown at 4b and 5b, respectively, in FIG. 1, and which substantially coincide with the central hole 18 provided in the base 3 of the support 2 and intended for the passage of the screw 19.

There will now be described the manufacture of an encaged nut according to the invention as well as the manner in which an assembly is obtained by means of such a nut.

There is first placed, e.g. on a table, a thin strip or band of composite material provided with holes which are preferably slightly larger than that of the nut 1, the said strip constituting the lower strip 5 mentioned previously.

A plurality of supports 2 are placed on the strip 5 at appropriate intervals.

Thereafter, there is applied a second strip of composite material onto the base 3 of the support 2, this strip constituting the upper strip 4 and, like the lower strip 5, being provided with holes 4b a little larger in size than the tapped bore of the nut 1.

At this stage, the strips 4 and 5 are compressed and a baking is effected so that both strips adhere to the outside of the periphery of the base 3 of the support 2. It will be stressed here that the base 3 of the support 2 will be fixed between the two strips 4 and 5 by the fact that they also adhere to one another in the regions of the holes 6 provided in the said base.

Thereafter, the nut 1 is placed between the legs 9 of the support 2 by means of the circlip 10. The nut 1 is thus floatingly retained on the support 2 as explained previously.

The strip of encaged nuts being thus obtained, the assembling of for example two panels $P_1$ and $P_2$ of a composite material may be carried out as follows.

The strip of encaged nuts is attached, e.g. adhesively, to the panel $P_1$. It should be stressed here that, owing to the flexibility of the strip, it will easily adhere to a panel displaying any lines of curvature.

Once this is done, it will be sufficient to apply the panel $P_2$ onto the panel $P_1$ and to effect the screwing by means of the screws 19 to obtain the assembly.

It should also be noted that, depending on the desired assembly, the strip of nuts can be easily severed so as to use a desired number of such nuts, or even separate single nuts. Also, not only the engaged nuts can be made into a strip as described previously, but they may as well be manufactured singly by using strips 4 and 5 of composite material of small length.

The invention therefore allows assembling members or parts of composite material by means of encaged nuts used singly or in the form of a flexible strip or band, which allow doing away with any riveting operations and preventing all the galvanic corrosion phenomena owing to the fact that the nut support is completely insulated from the parts to be assembled.

Of course, the invention is by no means limited to the forms of embodiment described and illustrated which have been given by way of example only. On the contrary, the invention includes all technical equivalents to the means described as well as their combinations if the latter are carried out according to its gist.

What is claimed is:

1. An encaged nut, comprising
   said nut,
   a substantially U-shaped support retaining said nut and comprising a base provided with a plurality of holes therethrough,
   an upper strip of synthetic material and a lower strip of synthetic material confining said base therebetween, said strips adapted to be attached to an element, prepared by the method comprising the steps of
   disposing a respective strip of synthetic material on opposite sides of said base of said substantially U-shaped support,
   at least one of compressing and heating said two strips to cause the same to adhere to one another along at least a portion of an external periphery of said base and in the region of said holes through said base, which is thus sandwiched between said two strips, and
   mounting said nut on said substantially U-shaped support.

2. An encaged nut, comprising
   said nut,
   a substantially U-shaped support retaining said nut and comprising a base and two legs,
   an upper strip of synthetic material and a lower strip of synthetic material confining said base therebetween, said lower strip being provided with parallel longitudinal edges and said upper strip being provided with at least one of longitudinal edges having notches and apertures therethrough, providing a passage for said legs of the U-shaped support, said strips being adapted to be attached to an element, prepared by the method comprising the steps of
   disposing a respective strip of synthetic material on opposite sides of said base of said substantially U-shaped support,
   at least one of compressing and heating said two strips to cause the same to adhere to one another along at least a portion of an external periphery of said base, which is thus sandwiched between said two strips, and
   mounting said nut on said substantially U-shaped support.

* * * * *